United States Patent [19]

Willett et al.

[11] Patent Number: 5,325,218
[45] Date of Patent: Jun. 28, 1994

[54] CHOLESTERIC POLARIZER FOR LIQUID CRYSTAL DISPLAY AND OVERHEAD PROJECTOR

[75] Inventors: Stephen J. Willett, St. Paul, Minn.; Gary L. Tritle, Austin, Tex.

[73] Assignee: Minnesota Mining and Manufacturing Company, St. Paul, Minn.

[21] Appl. No.: 999,230

[22] Filed: Dec. 31, 1992

[51] Int. Cl.$^5$ .................. G02F 1/133; G02F 1/1335; G03B 21/00

[52] U.S. Cl. ......................... 359/53; 359/40; 359/64; 359/65; 353/122; 353/DIG. 3; 353/DIG. 5

[58] Field of Search ........... 359/40, 53, 65, 64, 359/73; 353/122, DIG. 3, DIG. 5, 119

[56] References Cited

U.S. PATENT DOCUMENTS

| | | | |
|---|---|---|---|
| 4,019,808 | 4/1977 | Scheffer | 359/53 |
| 4,073,571 | 2/1978 | Grinberg et al. | 359/40 |
| 4,232,948 | 11/1980 | Shanks | 359/53 |
| 4,239,349 | 12/1980 | Scheffer | 359/53 |
| 4,416,514 | 11/1983 | Plummer | 350/335 |
| 4,436,392 | 3/1984 | Vanderwerf | 353/DIG. 3 |
| 4,652,101 | 3/1987 | Grunwald | 359/40 |
| 4,756,604 | 7/1988 | Nakatsuka et al. | 359/41 |
| 4,770,500 | 9/1988 | Kalmanash et al. | 359/53 |
| 4,832,461 | 5/1989 | Yamagishi et al. | 359/41 |
| 4,838,655 | 6/1989 | Hunahata et al. | 350/335 |
| 4,917,465 | 4/1990 | Conner et al. | 350/335 |
| 4,987,410 | 1/1991 | Berman et al. | 340/705 |
| 5,050,966 | 9/1991 | Berman | 359/38 |
| 5,122,887 | 6/1992 | Mathewson | 359/53 |
| 5,124,818 | 6/1992 | Conner et al. | 359/53 |
| 5,159,363 | 10/1992 | Brauning | 353/122 |

FOREIGN PATENT DOCUMENTS 63-13019 1/1988 Japan ..................... 359/41

OTHER PUBLICATIONS

Uchida, "Color LCDs: Technological Developments," Japan Display '83, pp. 202-205.
Uchida, "Multicolored liquid crystal displays," Optical Engineering, vol. 23, No. 3 (May/Jun. 1984), pp. 247-252.
Belayev et al., "Large Aperture Polarized Light Source and Novel Liquid Crystal Display Operating Modes," Japanese Journal of Applied Physics, pp. L634-L637 (Mar. 7, 1990).
Schadt et al., "New Liquid Crystal Polarized Color Projection Principle," Japanese Journal of Applied Physics, pp. 1974-1984 (Jul. 21, 1990).
Maurer et al., "Polarizing Color Filters Made from Cholesteric LC Silicones," SIC 1990 Symposium Digest, pp. 110-113 (1990).
Crooker et al., "A Color Display Using Polymer-Dispersed Chiral Liquid Crystals," SID 1990 Symposium Digest, pp. 214-216 (1990).
Schadt et al., "Novel Polarized Liquid-Crystal Color Projection and New TN-LCD Operating Modes," SID 1990 Symposium Digest, pp. 324-326 (1990).
Haberle et al., "Crosslinkable Cholesteric LC-Silicones," Record of the International Display Research Conference, pp. 57-59 (1991).

*Primary Examiner*—Anita P. Gross
*Attorney, Agent, or Firm*—Gary L. Griswold; Walter N. Kirn; Jack V. Musgrove

[57] ABSTRACT

A liquid crystal display (LCD) panel employs a cholesteric polarizer which passes light of a first circular polarization, but reflects light of a second circular polarization. The LCD panel may be monochrome or color; in the color embodiments, several different color filters are used, each having one or more cholesteric polarizers tuned to a specific bandwidth in the visible spectrum. These polarizers replace dyed (neutral or dichroic) polarizers of prior art LCD panels, and provide improved color purity. The invention may be enhanced by providing a light recycling scheme whereby the handedness of the circularly polarized light reflected by the polarizers is changed and redirected back to the polarizers. This recycling scheme may also be adapted to provide an overhead projector having a high output polarized light source, particularly useful in conjunction with an LCD panel.

17 Claims, 4 Drawing Sheets

CHOLESTERIC POLARIZER FOR LIQUID CRYSTAL DISPLAY AND OVERHEAD PROJECTOR

BACKGROUND OF THE INVENTION

1. Field of the Invention

The present invention generally relates to optical polarizers, and more particularly to a novel liquid crystal display panel and an overhead projector which incorporate tuned cholesteric polarizers.

2. Description of the Prior Art

Liquid crystal display (LCD) panels generally employ one of several different types of polarizers, including dyed stretched polymeric (neutral and dichroic), cholesteric or thin-film polarizers. For example, U.S. Pat. No. 4,917,465 discloses an LCD panel (depicted in FIG. 1) which uses both neutral polarizers 1 and dichroic polarizers 2 in a stacked arrangement. The dichroic dyes and associated liquid crystal layers 3 are selected to provide desired optical responses in order to yield the three primary subtractive colors, magenta, cyan and yellow.

One drawback to conventional dyed polarizers is that they are absorptive, i.e., polarization occurs due to different absorption coefficients for light polarized in different directions. This results in a loss of more than 50% of the available light, which adversely affects illumination in display systems using LCD's. Absorption of this amount of energy can also lead to heat management problems. In some projection systems using LCD's, such as overhead projectors (OHP's), illumination difficulties may be overcome by providing a brighter light source, such as a metal halide lamp; this solution, however, is expensive, and typically exacerbates heat management problems, and further introduces a serious safety hazard.

Another drawback to dichroic dyed polarizers is that their spectral cutoffs are limited by the dyes themselves. In many uses, such as stacked, color supertwisted nematic (STN) LCD panels, these cutoffs are not as sharp as would be desired, and their use results in less than ideal color purity and brightness or, alternatively, necessitates use of neutral polarizers instead.

Cholesteric polarizers have sharper spectral cutoffs which can be employed to improve these uses, and are reflective rather than absorptive but, prior to the present invention, cholesteric polarizers have not been incorporated into flat panel LCD designs. These polarizers utilize liquid crystal material in which the elongated molecules are parallel to each other within the plane of a layer, but the direction of orientation twists slightly from layer to layer to form a helix through the thickness of the polarizer. Cholesteric polarizers are either right- or left-handed and, depending upon this handedness, transmit or reflect circularly polarized light in a narrow optical bandwidth. As suggested by Schadt et al. (see SID 1990 Symposium Digest pp. 324-326; and 29 Jap. J.Appl.Phys. pp. L634-L637 and pp. 1974-1984), the reflective properties of cholesteric filters may be exploited to recycle the reflected light. See also Maurer et al. (SID 1990 Symposium Digest pp. 110-113, and Record of the International Display Research Conference, pp. 57-59). Unfortunately, these devices are incompatible with the configuration of a flat LCD panel, such as is used in either direct view or with an OHP since, for example, their wide-aperture case does not generate highly polarized light; other of the devices are particularly unsuitable in stacked LCD designs.

In U.S. Pat. No. 4,987,410, cholesteric polarizers are used to selectively block one of two images in a head-up/head-down display. While that patent further discloses the use of multiple polarizers to selectively block discrete color images, the polarizers are never used for manipulating the color tone of a single image. The configuration of the '410 device is also generally incompatible with that of an LCD panel. See additionally U.S. Pat. No. 5,050,966. It would, therefore, be desirable and advantageous to devise an LCD panel which incorporates cholesteric polarizers, but provides high efficiency, wide aperture transmission of the light for stacked LCD panel designs. It would be further advantageous if such a wide aperture polarized light source could be directly incorporated into an OHP to accommodate any type of LCD panel (e.g., color or monochrome). Finally, the systems would preferably impart greater brightness, and be usable over a wider range of operating temperatures.

SUMMARY OF THE INVENTION

The foregoing objectives are achieved in a stacked liquid crystal display panel having a plurality of cholesteric polarizers forming color and neutral filters, interposed between supertwisted, nematic (STN) liquid crystal cells. Quarter-wave plates are used to convert the circularly polarized light into linearly polarized light before entry into the STN layers. Fresnel lenses are used to collimate and condense the light, increasing the efficiency of the panel. If a subtractive scheme is used to blend colors from the three STN layers, the color cholesteric filters will correspond to two primary subtractive colors; this means that each filter will include one or more polarizers tuned to the bandwidth of a single primary additive color. Conversely, if an additive scheme is used, each filter will correspond to a primary additive color; this means that each filter will include two or more polarizers tuned to two bandwidths of the complementary primary additive colors. In an alternative embodiment, no neutral polarizers are used.

The cholesteric polarizers of the present invention may also be incorporated into an overhead projector to yield a high output polarized light source. A plurality of polarizers are selected, according to their bandwidths, to cover the entire visible spectrum, and are combined with a single quarter-wave plate and two Fresnel lenses. When this structure is incorporated into the base of an OHP, a light source which includes a back reflector may be used to recycle that portion of light reflected by the polarizers.

BRIEF DESCRIPTION OF THE DRAWINGS

The novel features of the invention are set forth in the appended claims. The invention itself, however, will best be understood by reference to the accompanying drawings, wherein:

DESCRIPTION OF THE PREFERRED EMBODIMENTS

Figure 1:
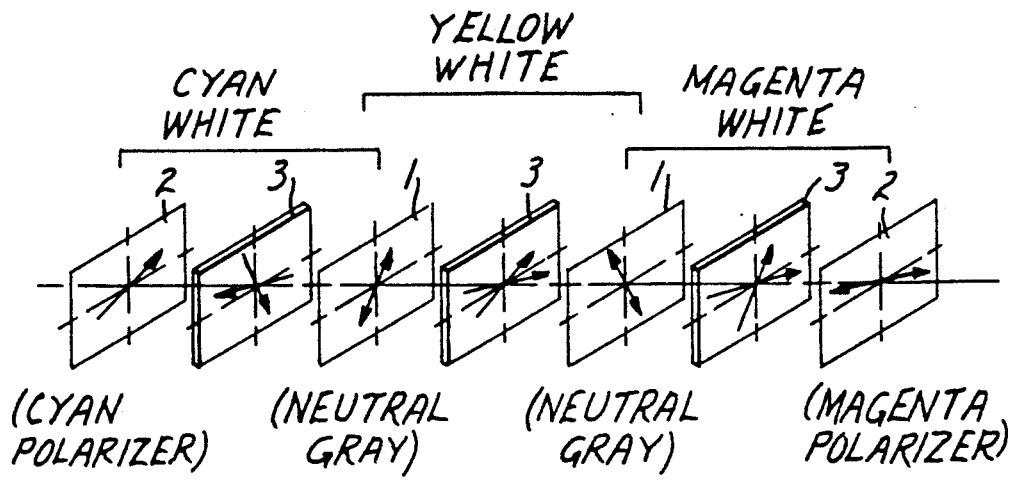
FIG. 1 is an exploded perspective view of a prior art, color, stacked STN LCD panel using neutral and dichroic polaroid polarizers.
Figure 2:
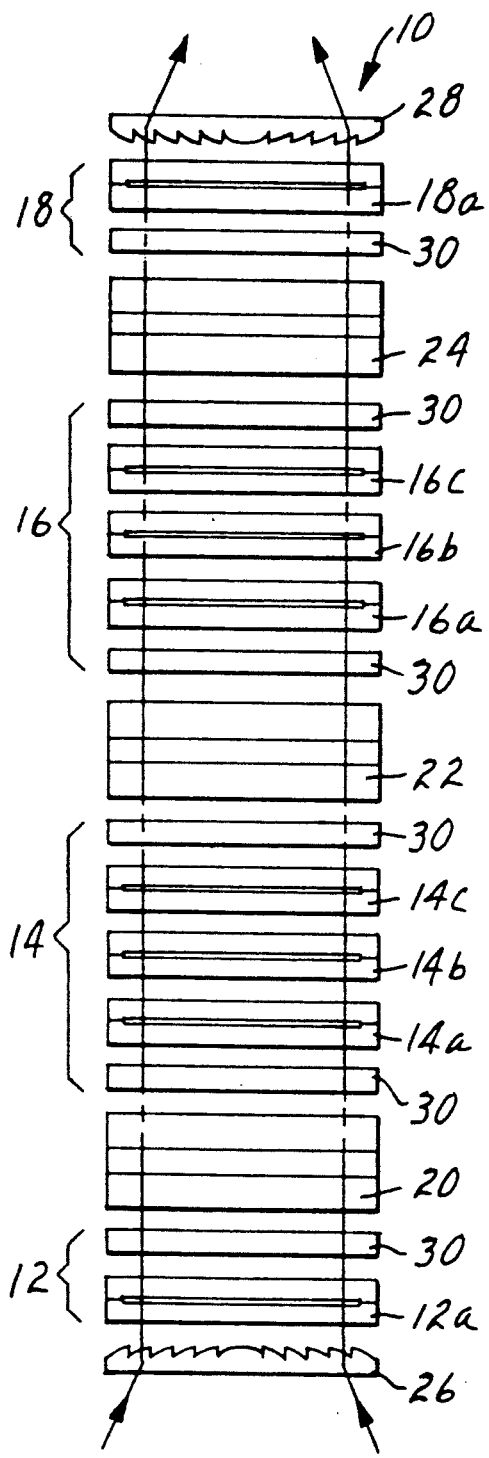
FIG. 2 is a schematic side view of one embodiment of the color LCD panel of the present invention, using cholesteric color and neutral filters.

With reference now to the figures, and in particular with reference to FIG. 2, there is depicted one embodiment 10 of the liquid crystal display (LCD) panel of the present invention. LCD panel 10 generally comprises a plurality of reflective polarizing filters 12, 14, 16 and 18, a plurality of liquid crystal cells 20, 22 and 24, and two Fresnel lenses 26 and 28. Lens 26 is used to collect and collimate the light for the stacked arrangement, while lens 28 is used to condense the light toward other optical components (such as the projector head of the overhead projector described in FIG. 6). Each of the filters includes one or more quarter-wave plates 30, and at least one cholesteric circular polarizer. For example, in the embodiment of FIG. 2, which utilizes a subtractive color scheme similar to the prior art device of FIG. 1, filter 12 preferably includes a single cholesteric polarizer 12a which is tuned to red wavelengths (i.e., an approximate bandwidth of 600 nm to 700 nm). Such a cholesteric polarizer will pass all green and blue hues, but will pass only one polarization component of red. The component to be passed depends upon the handedness of the cholesteric molecules in polarizer 12a. If those molecules are right-handed, then right-handed (RH) circularly polarized (CP) light will be reflected, but left-handed (LH) CP light will be transmitted. Transmission and reflection of these components is nearly 100% efficient. Although the handedness of the cholesteric material does not matter, the inventors are presently using material which is left-handed (discussed further below).

In order to use a subtractive color scheme, it is necessary to provide filters for the three primary subtractive colors, cyan, yellow and magenta. In the present invention, this is accomplished by combining the tuned cholesteric filters with correspondingly tuned liquid crystal cells. In LCD panel 10, filter 12 is combined with cell 20 to create a cyan filter. As explained above, red light passing through polarizer 12a is split into two circularly polarized components, with only one of those components passing through polarizer 12a. The first quarter-wave plate 30 then converts this circularly polarized light into linearly polarized light so that it may be further regulated by cell 20. Cell 20 is tuned to select or deselect (reject) passage of this red light by modulating the phase of the linearly polarized light (rotating the angle of polarization), as discussed in U.S. Pat. No. 4,917,465 (see FIG. 9 of that patent), which is hereby incorporated. Tuning is accomplished by choosing an appropriate thickness for the liquid crystal layer of cell 20, and by choosing a material which has an appropriate optical anisotropy. The preferred material is a supertwisted nematic (STN) liquid crystal. The cells have individually addressable pixels as known in the art.

Filter 14 is neutral and includes three separate cholesteric polarizers 14a, 14b and 14c which are tuned, respectively, to the three primary colors red, green and blue. A first quarter-wave plate 30 in filter 14 is used to convert the linear polarized light to circular polarized light, and a second quarter-wave plate 30 in filter 14 is used to convert the circular polarized light into linear polarized light. Blue light passing through filter 14 is selected or deselected by yellow cell 22. Since all light outside of each polarizer's bandwidth completely passes through the polarizer, several such polarizers can be stacked in series without affecting the optical performance of each. In this regard, it is understood that separate polarizers are needed for a neutral filter in order to cover the entire visible spectrum. As discussed further below, more than three polarizers may be needed if the bandwidths are particularly narrow or, conversely, it is conceivable that a single polarizer could be devised which would have a sufficiently large bandwidth to cover the visible spectrum.

Filter 16 is essentially identical to filter 14, and includes three cholesteric polarizers 16a, 16b and 16c which are also tuned, respectively, to the three primary colors red, green and blue. Green light passing through filter 14 is selected/deselected by magenta cell 24. Another pair of quarter-wave plates 30 are used as in filter 14. Filter 18, which includes a single cholesteric polarizer 18a tuned to green, and another quarter-wave plate 30 interposed between polarizer 18a and cell 24, acts as an analyzer to render the modulation pattern in the outgoing light visible.

Those skilled in the art will appreciate the significant concern of light loss due to reflections at the multiple air-glass interfaces between the various components in LCD panel 10. These losses can be minimized by sharing glass substrates to form adjacent layers between the components, by using anti-reflection coatings at air interfaces, by using index-matching adhesives and laminations in place of air gaps, or any combination of these techniques.

Figure 3:
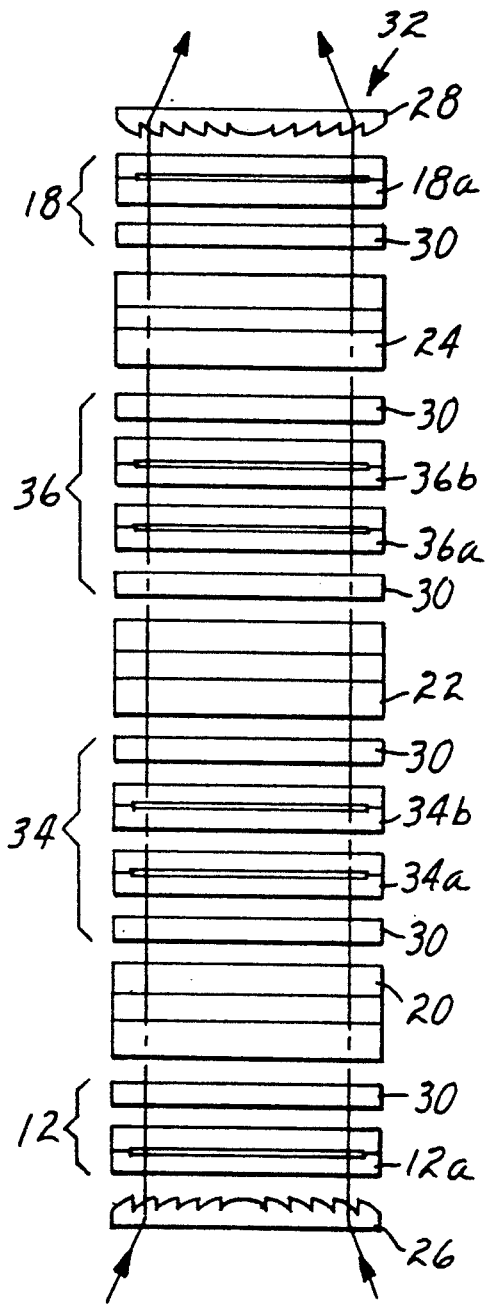
FIG. 3 is a schematic side view of another embodiment of the color LCD panel of the present invention, using no neutral filters.

Referring now to FIG. 3, that figure depicts another embodiment 32 of an LCD panel made according to the present invention. Panel 32 includes the same rear (cyan) and front (magenta) filters 12 and 18, but neutral filters 14 and 16 have been replaced, respectively, with green and red filters 34 and 36. Filter 34 includes two cholesteric polarizers 34a and 34b tuned, respectively, to red and blue, while filter 36 includes two cholesteric polarizers 36a and 36b tuned, respectively, to green and blue. Both filters use two quarter-wave plates each, and the same cells 20, 22 and 24 may be used in panel 32. This embodiment is considered most preferable since panel 32 combines high quality color polarizers with the greatest light transmission possible in a stacked, color STN LCD panel.

Figure 4:
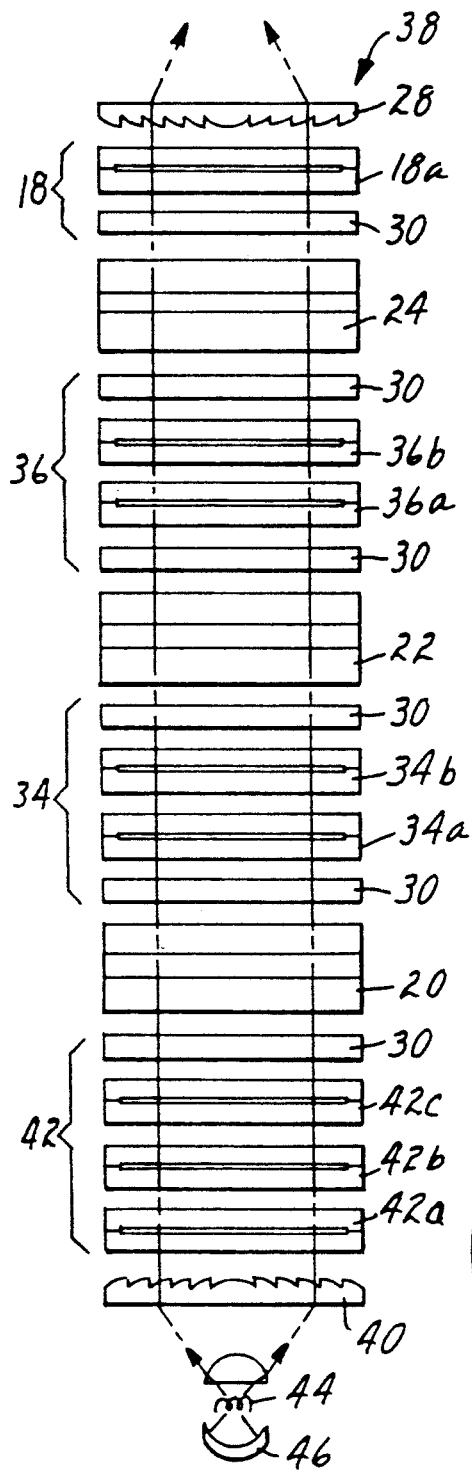
FIG. 4 is a schematic side view of still another embodiment of the color LCD panel of the present invention, in which the first filter polarizes light in the entire visible spectrum.

Yet another embodiment 38 of an alternative LCD panel is shown in FIG. 4. This embodiment is essentially identical to panel 32 except for the use of a different rear Fresnel lens 40 and a different first filter 42. Panel 38 is designed to take advantage of the reflective properties of cholesteric polarizers, and is particularly useful in display systems having a point light source 44, such as an overhead projector. Accordingly, Fresnel lens 40 should be a convergent lens. Filter 42 is neutral, in order to allow for recycling of that portion of the light which is reflected by the polarizers 42a, 42b and 42c. This reflected light may be recycled by providing a mirror 46 or other reflective surface proximate to light source 44. In this manner, the light which is reflected by the polarizers is redirected (by lens 40) toward mirror 46; light reflected by polarizers 42b and 42c passes back downwardly through the other polarizers without affecting the reflected light. When the light is reflected in mirror 46, it changes the handedness of the circular polarization. Thus the recycled light is now of the proper handedness to pass through filter 42.

Figure 5:
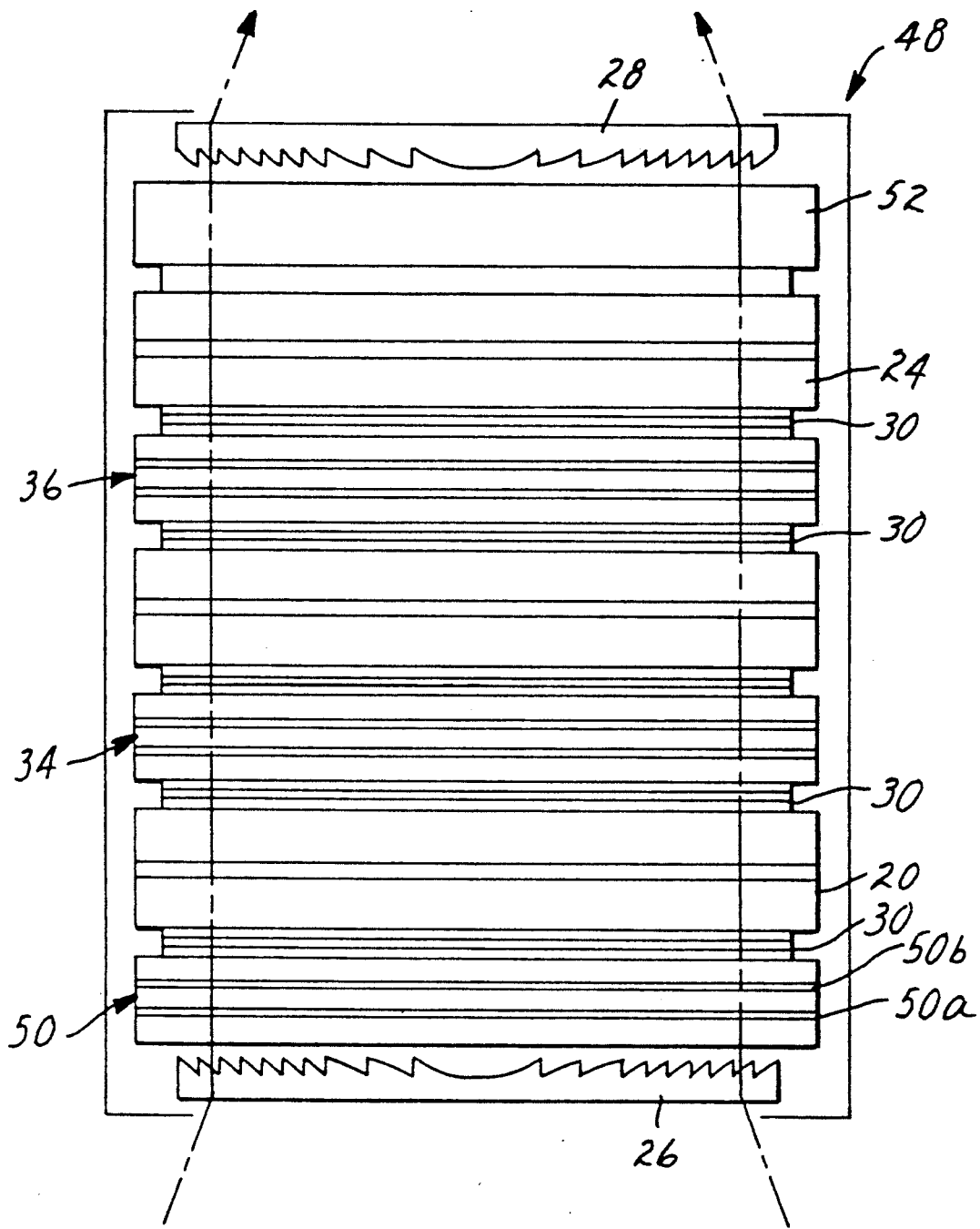
FIG. 5 is a schematic side view of yet another embodiment of the color LCD panel of the present invention, utilizing an additive color scheme.

Circular, cholesteric polarizers may also be used to improve the performance (color purity) of other multi-layer color LCD panels, such as those depicted in U.S. Pat. Nos. 4,416,514 and 4,838,655. For example, cholesteric polarizers may be used to create an additive LCD panel 48, as illustrated in FIG. 5. This panel is also very similar to the foregoing panels in that it employs the same LCD cells 20, 22 and 24, a plurality of quarter-wave plates 30, and a pair of Fresnel lenses 26 and 28. It also uses the same intermediate filters 34 and 36, but the first filter 50 is now a blue filter, having two cholesteric polarizers 50a and 50b tuned to red and green, respectively. FIG. 5 also serves to illustrate how the analyzer 52 in any of the foregoing embodiments may be a neutral (stretch polymeric) polarizer rather than a cholesteric polarizer combined with a quarter-wave plate. It is understood that the order of the filters (as well as the order of the component polarizers in each filter) may vary without affecting the panel's output. It is also understood that cholesteric polarizers can replace one, several, or all of the dyed dichroic and neutral polarizers of the prior art panels. It is further understood that the present invention could be applied to hybrid additive color LCD systems, such as the guest-host twisted nematic (TN) system of U.S. Pat. No. 4,838,655. The LCD cells to be used should rotate linear polarized light between 90° (when off) and 0° (when fully on), and may be chosen from TN, ferroelectric, or other LCD types.

Those skilled in the art will appreciate that other variations of the disclosed embodiments may be devised, including an embodiment (not shown) that eliminates the need for the quarter-wave plates by providing LCD cells which modulate circular polarized light. Such cells include TN cells that act as a half wave retarder, instead of the conventional TN waveguiding mode, and electrically-controlled birefringent ECB LCD's, also known as DAP LCD's (deformed vertically-aligned phase).

Figure 7:
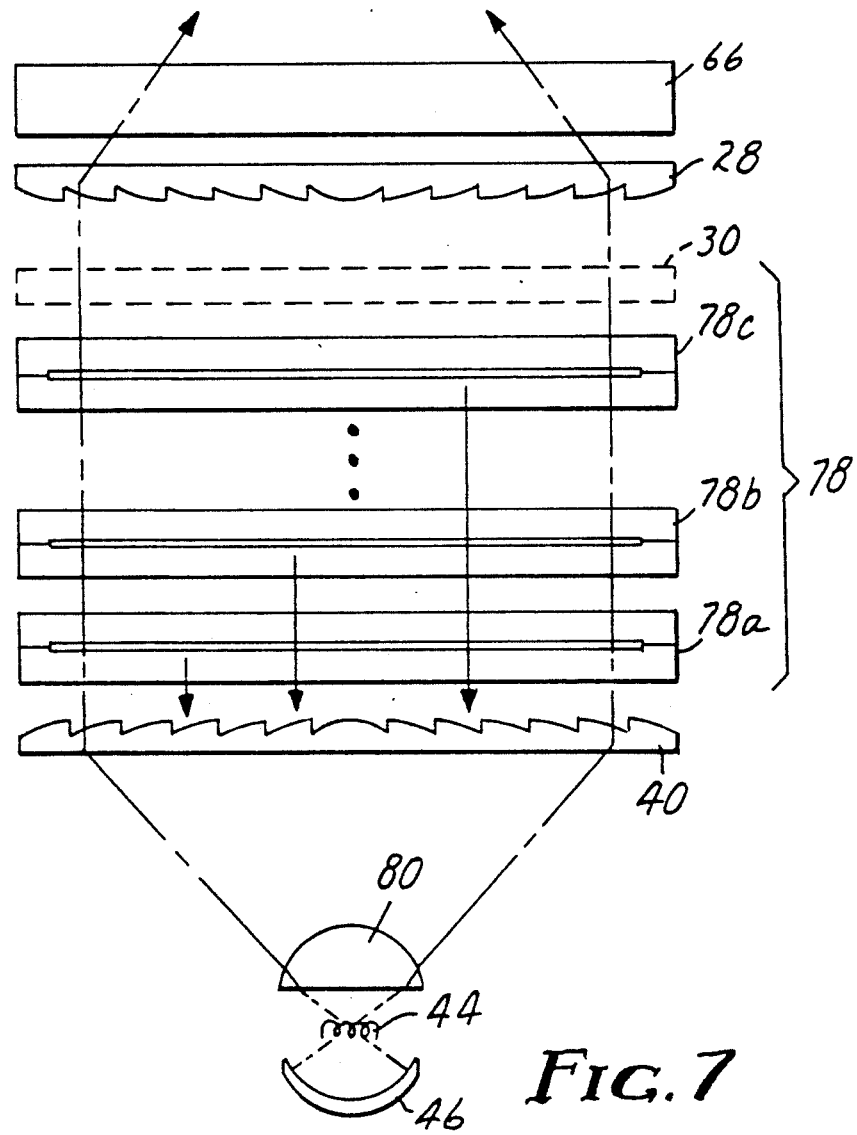
FIG. 7 is a schematic side view of the cholesteric filter and light source located in the overhead projector of the present invention.
Figure 6:
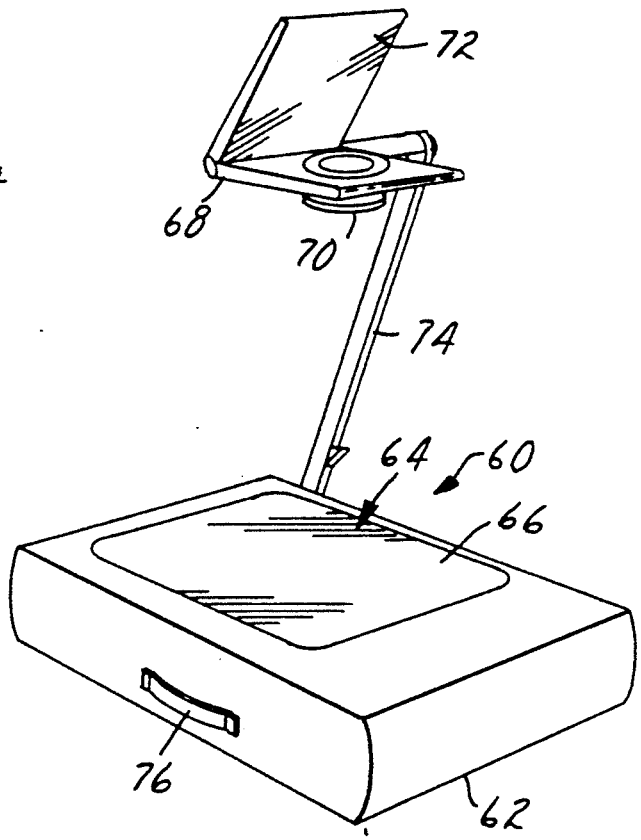
FIG. 6 is a perspective view of one embodiment of the high output polarized light overhead projector of the present invention.

Turning now to FIG. 6, the recycling concept of FIG. 4 may also be applied to an overhead projector (OHP) 60. OHP 60 includes many conventional parts, such as a base 62 having a stage area 64 (typically a glass sheet 66), a projector head 68 having a projection lens 70 and mirror 72, and an arm 74 attached to base 62 and supporting head 68. Arm 74 may be pivotally attached to base 62 to impart a more compact profile for storage and transportation; a carrying strap 76 may also be attached to base 62 to facilitate transportation. With reference to FIG. 7, it can be seen that a reflective, polarizing filter 78 may be provided within base 62. As with filter 42, filter 78 contains a plurality of cholesteric filters 78a, 78b and 78c as may be required to cover the entire visible spectrum. Filter 78 also includes another quarter-wave plate 30, and is surrounded by the same pair of Fresnel lenses 40 and 28. The light source for OHP 60 includes lamp 44, reflector 46 and a condenser 80. Filter 78 is preferably constructed as a drawer which may be slidably removed from base 62. In this manner, filter 78 may be located in an operative position when polarized light output is desirable (as when using an LCD panel on top of sheet 66), or filter 78 may be removed from the optical path if polarized light is not necessary (as when using overhead transparency sheets); it may not be necessary to remove filter 78 provided the projected visual image is no less acceptable to a normal viewer. Of course, other features may be provided in OHP 60 which are outside the scope of the present invention, such as providing a folded optical path between the light source and stage area 64.

The construction of FIG. 7 results in an OHP having nearly 100% polarization efficiency, provided that a highly reflective surface (such as silver) is used on mirror 46, and interface losses are minimized as previously discussed. A fairly open filament is preferred for lamp 44 so that most of the light reflected by filter 78 may bypass the filament to allow reflection by mirror 46. An acceptable open filament capsule lamp having ANSI code EYB is available from Osram Corp. of Montgomery, N.Y. It may further be desirable to provide a quarter-wave plate 30 which is rotatable with respect to the polarizers in order to match the angle of polarization required by any LCD panel. In the case where OHP 60 is used with an LCD panel, the rear polarizer on the panel is redundant and may be removed for greater light transmission.

The foregoing invention may be modified to provide a reflective-type OHP, wherein the light source is located above the stage (in the projection head), and the stage itself consists of a reflective surface. In this embodiment, a (removable) cholesteric filter might be located in the projection head, between the lamp and the stage, to provide the high output, polarized light. This embodiment would also take advantage of light recycling by providing a reflector behind the lamp.

Several different materials may be used in the cholesteric polarizers of the present invention. The cholesteric material might be chiral, and can further be a monomer or a polymer. The most common cholesteric liquid crystals are aliphatic esters of cholesterol having a left-handed helix. In the preferred embodiment, the material is polymeric, since the typical bandwidth for cholesteric liquid crystal monomers is about 50 nm, but that of polymers having cholesteric pendant groups is about 100 nm, provided they have the appropriate pitch and refractive anisotropy. Besides having a broader spectral range, cholesteric polymers are much less temperature sensitive, and can also be cross-linked to make a solid film, eliminating the need for separate glass plates between the polarizer and adjacent components. The preferred cholesteric composition is cholesteryl polysiloxane copolymer bound in a 4-membered ring. Polarizers were formed by sheared alignment between glass plates, resulting in spectral widths of 100–150 nm. Peak wavelengths are selected by adjusting the ratio of the copolymers.

When cholesteric polymers having a bandwidth of around 100 nm are used, 3 layers can cover entire visible spectrum. Of course, the monomer polarizers could be used, but 6 layers would be required to cover the full visible spectrum. It will be appreciated that future improvements in cholesteric polarizer technology may result in a single layer being sufficient to cover the entire visible spectrum.

The present invention presents clear advantages over prior art LCD panels and LCD/OHP combinations. The use of cholesteric polarizers imparts substantially improved color purity due to the sharp response curves and narrow bandwidths of the cholesteric filters, and further provides more illumination (brighter polarized output). This invention also avoids problems relating to heat management found with absorptive polarizers, including color shifts and fading.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, the present invention could also be used with laptop computer LCD displays, or large-screen LCD televisions. Also, a wider variation in color tones could be provided by using more filter/cell pairs tuned to narrower bandwidths. It is therefore contemplated that the appended claims will cover such modifications that fall within the true scope of the invention.

I claim:

1. A display device adapted to display color images, comprising:

first, second and third circular polarizers which pass circularly polarized light in a bandwidth within the visible spectrum, each of said polarizers being generally planar;

first, second, third, fourth and fifth quarter-wave plates for converting circularly polarized light into linearly polarized light, each of said quarter-wave plates being generally planar;

first, second and third addressable, liquid crystal cells for selectively modulating the phase of linearly polarized light;

lens means for collecting and collimating light;

said first circular polarizer being interposed between said lens means and said first liquid crystal cell, and tuned to circularly polarize light of a first primary color;

said first quarter-wave plate being interposed between said first circular polarizer and said first liquid crystal cell;

said first liquid crystal cell being tuned to selectively rotate linearly polarized light of said first primary color;

said second circular polarizer being interposed between said first and second liquid crystal cells, and tuned to circularly polarize light of all three primary colors;

said second quarter-wave plate being interposed between said second circular polarizer and said first liquid crystal cell;

said third quarter-wave plate being interposed between said second circular polarizer and said second liquid crystal cell;

said second liquid crystal cell being tuned to selectively rotate linearly polarized light of a second primary color;

said third circular polarizer being interposed between said second and third liquid crystal cells, and tuned to circularly polarize light of all three primary colors;

said fourth quarter-wave plate being interposed between said third circular polarizer and said second liquid crystal cell;

said fifth quarter-wave plate being interposed between said third circular polarizer and said third liquid crystal cell;

said third liquid crystal cell being tuned to selectively rotate linearly polarized light of a third primary color; and analyzer means for rendering visible modulated light exiting said third liquid crystal cell.

2. The display device of claim 1 further comprising second lens means, adjacent said analyzer means, opposite from said fifth quarter-wave plate, for condensing light which passes through said analyzer means.

3. The display device of claim 1 wherein at least one of said polarizers:

passes light in said bandwidth which is circularly polarized with a first right/left handedness; and reflects light in said bandwidth which is circularly polarized with a second right/left handedness.

4. The display device of claim 1 wherein at least one of said polarizers comprises a cholesteric polarizer tuned to said bandwidth.

5. A display device adapted to display color images, comprising:

first, second and third circular polarizers which pass circularly polarized light in a bandwidth within the visible spectrum, each of said polarizers being generally planar;

first, second and third addressable, liquid crystal cells for selectively modulating the phase of linearly polarized light;

first, second, third, fourth and fifth quarter-wave plates for converting circularly polarized light into linearly polarized light, each of said quarter-wave plates being generally planar;

lens means for collecting and collimating light;

said first circular polarizer being interposed between said lens means and said first liquid crystal cell, and tuned to circularly polarize light of a first primary color;

said first quarter-wave plate being interposed between said first circular polarizer and said first liquid crystal cell;

said first liquid crystal cell being tuned to selectively rotate linearly polarized light of said first primary color;

said second circular polarizer being interposed between said first and second liquid crystal cells, and tuned to circularly polarize light of said first primary color and of a second primary color;

said second quarter-wave plate being interposed between said second circular polarizer and said first liquid crystal cell;

said third quarter-wave plate being interposed between said second circular polarizer and said second liquid crystal cell;

said second liquid crystal cell being tuned to selectively rotate linearly polarized light of said second primary color;

said third circular polarizer being interposed between said second and third liquid crystal cells, and tuned to circularly polarize light of said second primary color and of a third primary color;

said fourth quarter-wave plate being interposed between said third circular polarizer and said second liquid crystal cell;

said fifth quarter-wave plate being interposed between said third circular polarizer and said third liquid crystal cell;

said third liquid crystal cell being tuned to selectively rotate linearly polarized light of said third primary color; and analyzer means for rendering visible modulated light exiting said third liquid crystal cell.

6. The display device of claim 5 further comprising second lens means, adjacent said analyzer means, opposite from said fifth quarter-wave plate, for condensing light which passes through said analyzer means.

7. The display device of claim 5 wherein at least one of said polarizers:
passes light in said bandwidth which is circularly polarized with a first right/left handedness; and
reflects light in said bandwidth which is circularly polarized with a second right/left handedness.

8. The display device of claim 7 further comprising:
a fourth circular polarizer adjacent to said first circular polarizer, tuned to circularly polarize light of said second and third primary colors;
a light source at a known effective distance from the display device; and
a back reflector for said light source;
wherein said lens means comprises a convergent Fresnel lens having a focal length which is approximately equal to said effective distance.

9. The display device of claim 5 wherein at least one of said polarizers comprises a cholesteric polarizer tuned to said bandwidth.

10. A display device adapted to display color images, comprising:
first, second and third circular polarizers for passing circularly polarized light in a bandwidth within the visible spectrum, each of said polarizers being generally planar;
first, second and third addressable, liquid crystal cells for selectively modulating the phase of linearly polarized light;
first, second, third, fourth and fifth quarter-wave plates for converting circularly polarized light into linearly polarized light, each of said quarter-wave plates being generally planar;
lens means for collecting and collimating light;
said first circular polarizer being interposed between said lens means and said first liquid crystal cell, and tuned to circularly polarize light of a first primary color and a second primary color;
said first quarter-wave plate being interposed between said first circular polarizer and said first liquid crystal cell;
said first liquid crystal cell being tuned to selectively rotate linearly polarized light of said first primary color;
said second circular polarizer being interposed between said first and second liquid crystal cells, and tuned to circularly polarize light of said first primary color and of a third primary color;
said second quarter-wave plate being interposed between said second circular polarizer and said first liquid crystal cell;
said third quarter-wave plate being interposed between said second circular polarizer and second liquid crystal cell;
said second liquid crystal cell being tuned to selectively rotate linearly polarized light of said second primary color;
said third circular polarizer being interposed between said second and third liquid crystal cells, and tuned to circularly polarize light of said second and third primary colors;
said fourth quarter-wave plate being interposed between said third circular polarizer and said second liquid crystal cell;
said fifth quarter-wave plate being interposed between said third circular polarizer and said third liquid crystal cell;
said third liquid crystal cell being tuned to selectively rotate linearly polarized light of said third primary color; and
analyzer means for rendering visible modulated light exiting said third liquid crystal cell.

11. The display device of claim 10 further comprising second lens means, adjacent said analyzer means, opposite from said fifth quarter-wave plate, for condensing light which passes through said analyzer means.

12. The display device of claim 10 wherein at least one of said polarizers:
passes light in said bandwidth which is circularly polarized with a first right/left handedness; and
reflects light in said bandwidth which is circularly polarized with a second right/left handedness.

13. The display device of claim 10 wherein at least one of said polarizers comprises a cholesteric polarizer tuned to said bandwidth.

14. An overhead projector having high output polarized light, comprising:
a base having a stage area;
a projector head mounted to said base, proximate said stage area;
a light source in said base;
means for directing light from said light source to said stage area, defining an optical path;
means for reflecting light, said light reflecting means located adjacent said light source and opposite said stage area with respect to said optical path;
first lens means for collecting and collimating light from said light source toward said stage area;
second lens means, interposed between said first lens means and said stage area, for condensing light from said first lens means and directing it through said stage area toward said projector head;
polarizer means, located between said first and second lens means, for passing light of a first polarization, and for reflecting light of a second polarization; and
means for removing said polarizer means from said base.

15. The overhead projector of claim 14 wherein said polarizer means comprises at least one circular polarizer which passes light that is circularly polarized with a first right/left handedness, and reflects light that is circularly polarized with a second right/left handedness.

16. The overhead projector of claim 14 further comprising a quarter-wave plate interposed between said polarizer means and said second lens means.

17. The overhead projector of claim 14 wherein said removing means comprises a drawer which is slidably attached to said base, said polarizer means being located in said drawer.

* * * * *